Nov. 9, 1926.                            1,606,444
L. H. PIERSON ET AL
AUTOMOBILE TURN SIGNAL
Filed August 29, 1925
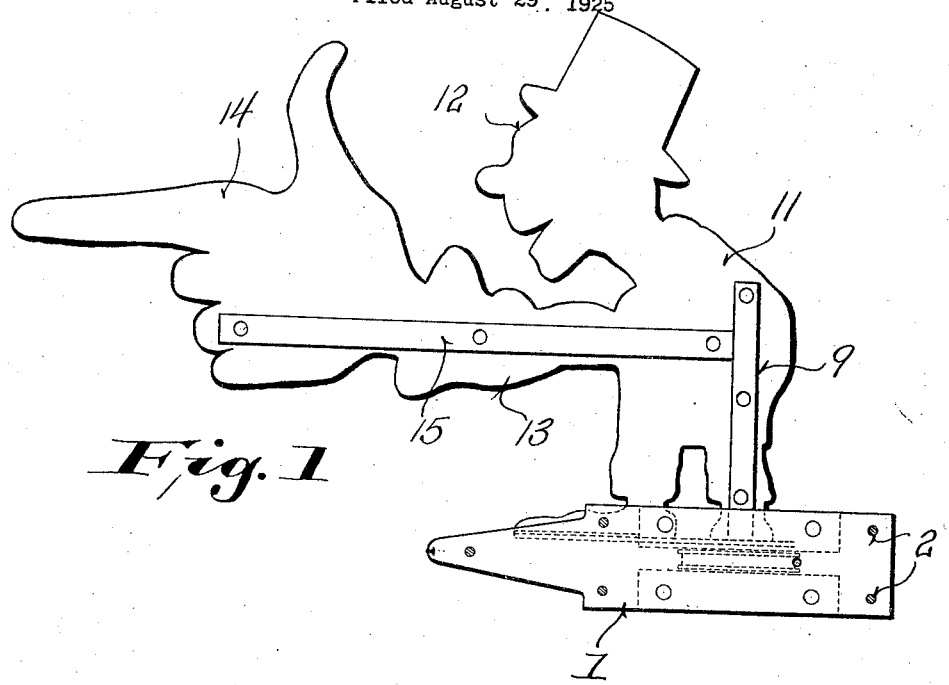
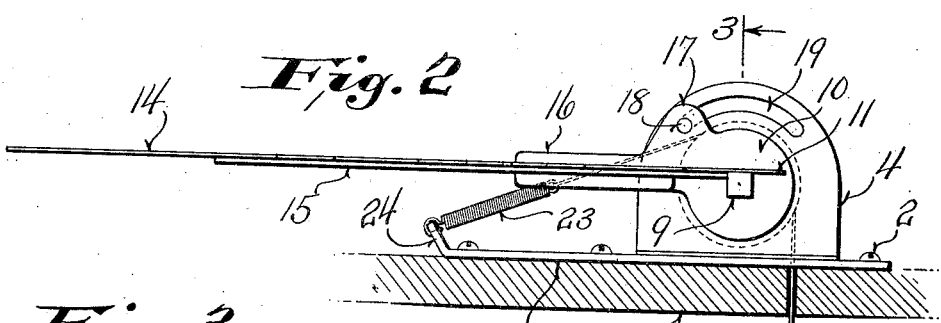
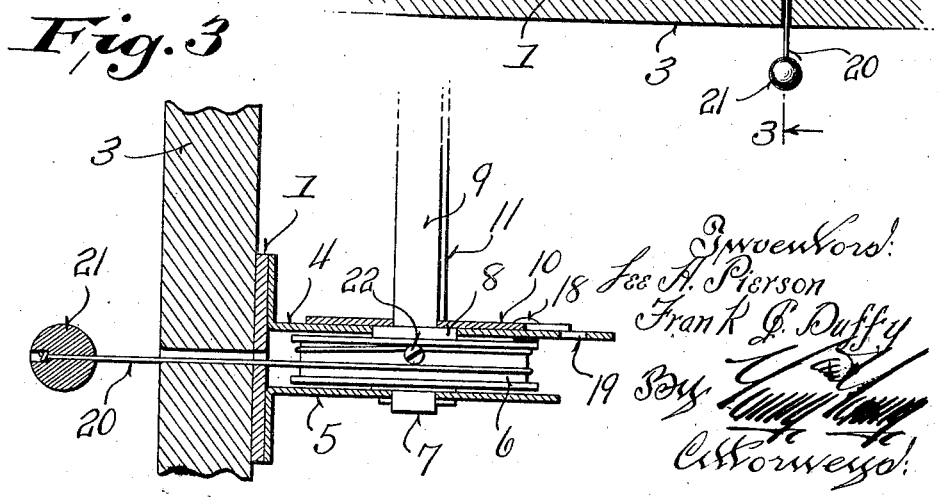

Patented Nov. 9, 1926.

1,606,444

UNITED STATES PATENT OFFICE.

LEE H. PIERSON AND FRANK J. DUFFY, OF JANESVILLE, WISCONSIN.

AUTOMOBILE TURN SIGNAL.

Application filed August 29, 1925. Serial No. 53,369.

This invention relates to automobile turn signals.

Objects of this invention are to provide a signal for automobiles which is of a novel and attractive character, and which is so constructed that it may be easily operated from the interior of the automobile to indicate the intention of the driver to make a turn.

Further objects are to provide a turn signal for automobiles in which a figure is provided which is formed from sheet material and is normally parallel to the direction of travel of the vehicle, and which is equipped with an elongated arm and a very much enlarged hand, so that when the figure is turned at right angles to the vehicle it will instantly attract attention and indicate the intention of the driver to make the turn in an unmistakable manner.

An embodiment of the invention is shown in the accompanying drawings, in which:—

Figure 1 is an elevation of the device showing it detached from the automobile.

Figure 2 is a plan view of the structure shown in Figure 1, such view showing a portion of the wall of the vehicle.

Figure 3 is a sectional view drawn to an enlarged scale approximately on the line 3—3 of Figure 2.

The device comprises an attaching plate 1 which is apertured to receive screws or other fastening means 2, whereby it is securely attached to a wall 3 of the automobile.

The supporting plate 1 is rigidly attached to a pair of spaced outwardly projecting plates 4 and 5 (see Figure 3) between which a drum 6 is positioned. This drum is provided with a downwardly projecting shaft 7 and with a round disk-like portion 8 which are guided in the plates 4 and 5. The upper portion of the apparatus comprises a post 9 preferably of rectangular contour which is rigidly attached to the drum and rotates therewith. Further, a base plate 10 is also rigidly attached to the post 9 and supports a figure formed from sheet metal. Preferably, the figure consists of a relatively small body 11 provided with an outwardly projecting head 12 and with an extended elongated arm 13. This arm terminates in a very much enlarged hand 14 provided with an outstretched finger pointing in the direction in which the figure appears to be looking.

It is to be noted from Figures 1 and 2 that the elongated arm and hand are braced by means of the strap 15 in order to insure rigidity of the device. The base plate 10, which rotates with the drum, is provided with an outwardly projecting tongue 16 which aids in supporting the figure. Further, it is provided with an ear 17 which carries a pin 18. The uppermost plate 4 is provided with an arcuate slot 19 within which the pin rides, such pin and slot forming a stop to limit the extreme motion of the device.

In order to operate the device, a cable 20 is wound about the drum 6 and passes through an aperture in the supporting plate 1 and through an aperture in the wall 3 of the vehicle. It is preferably provided with a manipulating knob 21 at its inner end. This cord is securely anchored to the drum by means of a screw or other fastening means 22, and the end of the cord is attached to one end of a tension spring 23, as shown in Figure 2, the other end of the tension spring being attached to an ear 24 formed upon the supporting plate 1. Preferably, as stated above, the figure is so designed as to be of startling and comical appearance, and the hand is preferably painted white so as to stand out and be clearly visible under all conditions. If desired, the hand may be painted with a luminous white paint although it has been found that ordinary white paint gives satisfactory results.

It is well known that the ordinary stop signals, consisting of lights, do not always attract the attention of the driver following the car. This invention, however, overcomes the defects noted for the standard turn signals and accomplishes this result by the novel means detailed above. In view of the fact that the figure is startling in appearance and of unusual design, and will instantly arrest the attention of a following or approaching driver and apprise him of the direction to be taken by the automobile equipped with this signal.

Further, it is to be noted that the device is of very simple construction and may be cheaply manufactured and easily operated.

Although the invention has been described in considerable detail, it is to be understood that the invention may be variously embodied and is, therefore, to be limited only as claimed.

We claim:

1. A turn signal comprising a supporting plate adapted to be attached to an automobile, a pair of members carried by said plate, a drum revolubly mounted between said members, a post projecting from said drum, a figure carried by said post and adapted to be bodily rotated when said drum is rotated, said figure being formed of sheet material and normally lying parallel to the axis of said automobile and having a projecting arm provided with an enlarged outwardly extended hand, an operating cord wound around said drum, and resilient means for returning said drum, said figure being painted and said hand being white.

2. A turn signal comprising a vertical supporting plate adapted to be attached to a vertical wall of an automobile, said plate having an aperture therethrough, and having an outwardly turned ear at one end thereon, a pair of horizontal supporting members projecting outwardly from said plate, a drum revolubly mounted between said members and having a cord wound thereon and projecting through the aperture in said vertical plate and adapted to extend into the automobile, said drum having a vertical projecting member extending upwardly therefrom, a figure formed of sheet metal carried by said member and having a body portion, a head and an enlarged hand in alignment with said head, said hand, head, and body portion of the figure lying in a plane paralleling the axis of the automobile, a cord extending from said drum, and a tension spring having one end attached to said cord and having the other end attached to said ear.

In testimony that they claim the foregoing they have hereunto set their hands at Janesville, in the county of Rock and State of Wisconsin.

LEE H. PIERSON.
FRANK J. DUFFY.